Aug. 2, 1960    T. L. LAGIOS    2,947,105
FISH SIGNAL DEVICE
Filed Sept. 8, 1958
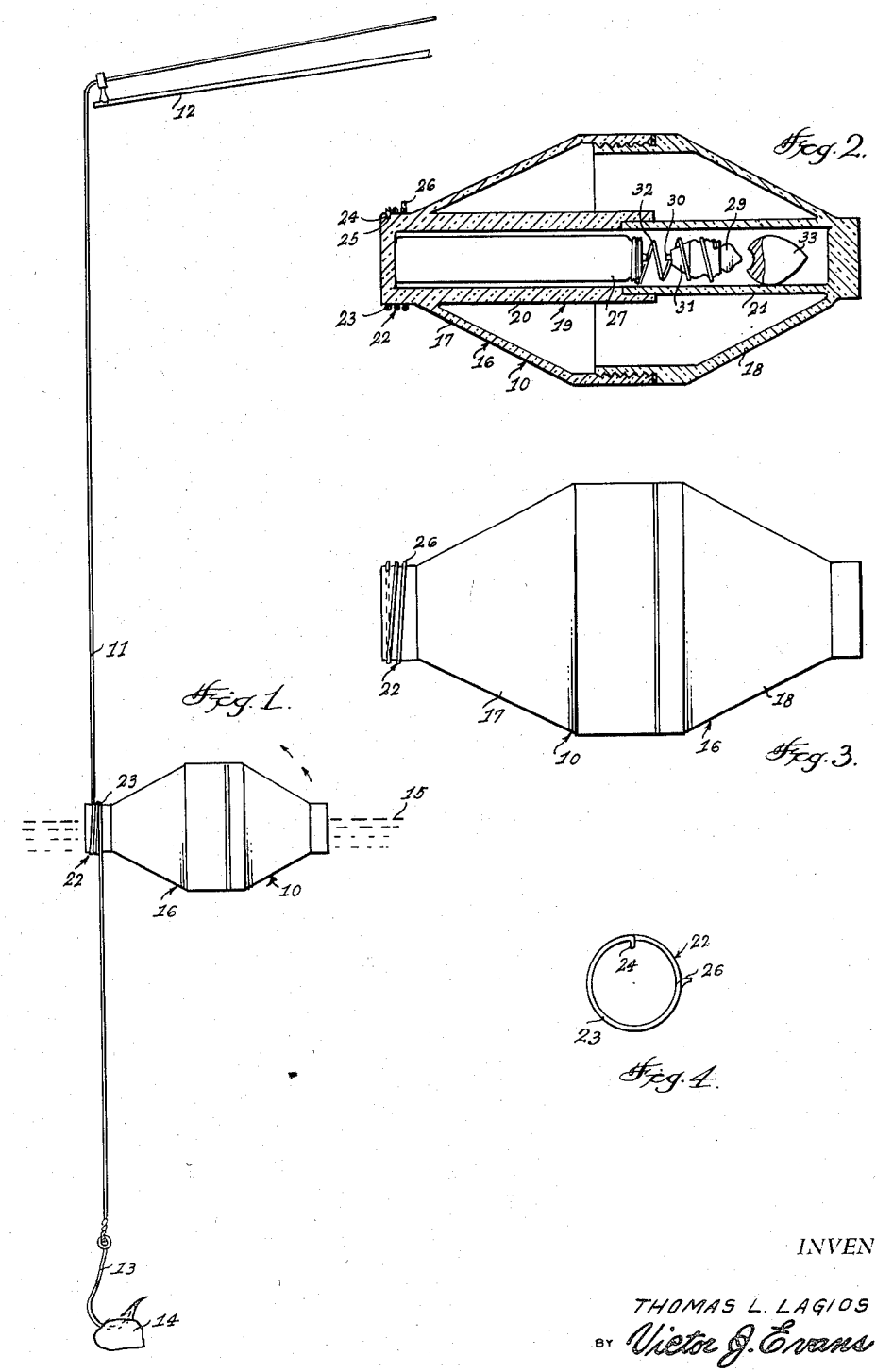
INVENTOR.
THOMAS L. LAGIOS
BY Victor J. Evans & Co.
ATTORNEYS

United States Patent Office 2,947,105
Patented Aug. 2, 1960

2,947,105
FISH SIGNAL DEVICE

Thomas L. Lagios, Box 519, Rte. 1, Antioch, Ill.

Filed Sept. 8, 1958, Ser. No. 759,537

3 Claims. (Cl. 43—17)

This invention relates to fishing equipment, and more particularly to a signal device which is adapted to give a signal when a fish strikes a fish line or hook.

The object of the invention is to provide a fish signal device which is adapted to be connected to a fishing line whereby when a fish strikes the fishhook, a light will be energized or actuated so that the person will know that there has been a strike on the line.

Another object of the invention is to provide a fish signal device which is adapted to be detachably or releasably connected to a fishing line, and wherein normally the device is in a horizontal position so that an electrical circuit between a battery and light bulb is open, but when a fish strikes the line or hook, the device will be tilted so that the light bulb will move into electrical contact with the battery so as to energize the bulb and signal or notify the fisherman.

A further object of the invention is to provide a fish signal device which is extremely simple and inexpensive to manufacture.

Other objects and advantages will be apparent during the course of the following description.

In the accompanying drawings, forming a part of this application, and in which like numerals are used to designate like parts throughout the same—

Figure 1 is an elevational view illustrating the fish signal device of the present invention.

Figure 2 is a longitudinal sectional view taken through the fish signal device.

Figure 3 is an elevational view of the device showing the device removed or detached from the fishing line.

Figure 4 is an end elevational view of the spring member.

Referring in detail to the drawings, the numeral 10 indicates the fish signal device of the present invention which is adapted to be releasably or detachably connected to a fishing line 11 that may be operatively connected to the usual fishing rod 12, Figure 1, and the numeral 13 indicates a fishhook which may have bait 14 thereon. In Figure 1 the numeral 15 indicates the water line or water level.

The fish signal device 10 of the present invention includes a hollow transparent housing which is indicated generally by the numeral 16, and the housing 16 includes a pair of sections 17 and 18 which are threadedly or detachably connected together, Figure 2.

Carried by the housing 10 and secured thereto or formed integral therewith is a hollow transparent case which is indicated generally by the numeral 19, and the case 19 includes a pair of alined hollow members 20 and 21 which have their meeting ends interfitting with each other.

A means is provided for releasably connecting the device to the fishing line 11, and this means comprises a spring member 22 which is mounted on an end of the case 19, and the spring member 22 includes a plurality of convolutions 23 as well as an inwardly projecting finger 24 on one end and an outwardly projecting finger 26 on the other end, Figure 4. The inner finger 24 is adapted to be seated in a recess 25 which is formed in an end of the case 19. As shown in Figure 1 the line 11 is adapted to be arranged in engagement with the spring member 22 whereby the device will be connected to the fishing line.

Mounted in the hollow transparent case 19 is a battery 27, Figure 2, and the battery 27 includes the usual terminal or contact 28 on an end thereof. The numeral 29 indicates a movable light bulb which is movably arranged in the hollow case 19, and the bulb 29 includes a terminal 30 that is mounted for movement into and out of engagement with the terminal 28 of the battery 27 as later described in this application. A reflector 31 is arranged contiguous to the light bulb 29, and a coil spring 32 is positioned between the light bulb 29 and battery 27 for normally urging or biasing the bulb 29 away from the battery 27 so as to open the circuit.

The numeral 33 indicates a weighted body member which is movably mounted in the case 19, so that when a fish engages the hook 13, the tension on the line 11 will cause the device 10 to be tilted from its horizontal position whereby the weighted body member 33 will engage the bulb 29 and move the contact 30 into engagement with the contact 32 so as to complete the circuit.

From the foregoing, it is apparent that there has been provided a fish signal device which will automatically provide a signal when a fish strikes the line. The device is especially suitable for use in night fishing since when the fish strikes the line or hook, the bulb 29 will be energized or lit so that the fisherman will know that it is time to reel in or pull in the fish.

In use, with the parts arranged as shown in the drawing, it will be seen that a portion of the fishing line 11 can be connected with the spring member 22. The spring member 22 is held in place on the device by means of the inwardly projecting finger 24 which engages the recess 25 in an end of the case 19. The other end portion or finger 26 can be used as a convenient finger grip for facilitating the manipulation or handling of the device. When there is no fish on the line, the device 10 is in the horizontal position with respect to the water level 15 as shown in Figure 1 so that the spring 32 will maintain the bulb 29 in the position of Figure 2 whereby the terminal 30 will be kept away from the terminal 28 so that the bulb 29 will be off. Then, when a fish takes the hook 13, tension on the line 11 will tilt the signal device 10 from the horizontal position of Figure 1 to an inclined position so that the movable weight or body member 33 will move against the bulb 29 and this in turn will urge the bulb 29 towards the battery 27 against the tension of the coil spring 32 so that the terminal 30 will move into engagement with the terminal 28 whereby the electrical circuit to the bulb 29 will be completed. Thus, the bulb will be lit when a fish strikes the line and the light rays from the bulb will pass out through the transparent case 19 and through the transparent housing 16 so as to provide a convenient signal to the fisherman.

The parts can be made of any suitable material and in different shapes or sizes.

It is to be noted that the housing 16 includes the pair of members 17 and 18 which are detachably or threadedly connected together so that these parts can be separated and also the members 20 and 21 can be separated as for example when a new battery 27 is to be inserted, or when the bulb or other parts are to be removed or replaced.

The body member 33 may be made of lead so that it will have the necessary weight to move the bulb. The parts can be made of a suitable color such as red so as to enhance the effectiveness or attractiveness thereof. The case 19 is watertight so that corrosion of the battery 27 and adjacent parts will be minimized or prevented.

In use, the bobber lies in the water in a horizontal position and when a fish nibbles or bites, the fish pulls the device 10 from the horizontal position so that the weight 33 moves the bulb 29 from the position shown in Figure 2 so as to compress the spring 32 whereby the light will go on to indicate that the fish is on the hook.

Some of the advantages of the present invention are as follows. There are no soldered parts to come loose, and the battery can be readily changed and also the other parts can be readily changed or replaced as desired. A positive contact is provided between the battery and bulb. By making the parts of transparent material, a bright light is provided and the spring member 22 insures that the device will not accidentally slip off or come off the line. There are no parts to break and the device cannot light up accidentally, and since fish usually bite with a jerky motion, the bobber will blink or flash instead of staying on until the fish actually takes the bait and then the light will stay on.

Furthermore, when the fish takes the bobber of the present invention under water, the user can readily see just where the fish is going so that the fisherman can keep the line from tangling with other lines that are in the vicinity. The present invention is easy and inexpensive to manufacture and it is made of a minimum number of parts which are ruggedly constructed.

Minor changes in shape, size and rearrangement of details coming within the field of invention claimed may be resorted to in actual practice, if desired.

I claim:

1. In a fish signal device, a hollow transparent housing including a pair of sections each of said sections being of truncated conical formation having a solid circular portion at the apex thereof with one of said sections having a reduced externally threaded portion and the other of said sections being internally threaded whereby said sections are detachably connected together, a hollow transparent case mounted in said housing and including a pair of interfitting alined hollow members that are integral with and extend inwardly of the solid circular portion on each section, a spring member on the circular portion at one end of said case, a battery positioned in said case, a coil spring engaging an end of said battery, a light bulb movably mounted in said case and engaging said coil spring, and a weighted body member arranged in said case and mounted for movement into and out of engagement with said light bulb so as to selectively move the light bulb into engagement with the battery when the fish signalling device tilts or moves from a horizonal position.

2. In a fish signal device, a hollow transparent housing including a pair of sections each of said sections being of truncated conical formation having a solid circular portion at the apex thereof with one of said sections having a reduced externally threaded portion and the other of said sections being internally threaded whereby said sections are detachably connected together, a hollow transparent case mounted in said housing and including a pair of interfitting alined hollow members that are integral with and extend inwardly of the solid circular portion on each section, a spring member on the circular portion at one end of said case, a battery positioned in said case, a coil spring engaging an end of said battery, a light bulb movably mounted in said case and engaging said coil spring, and a weighted body member arranged in said case and mounted for movement into and out of engagement with said light bulb so as to selectively move the light bulb into engagement with the battery when the fish signalling device tilts or moves from a horizontal position, said spring member including a plurality of convolutions which terminate in inner and outer projecting fingers, there being a recess in said case for receiving said inner finger.

3. The structure as defined in claim 2 wherein said spring member is adapted to be arranged in engagement with a fishing line.

References Cited in the file of this patent

UNITED STATES PATENTS

| | | |
|---|---|---|
| 2,205,352 | Fisher | June 18, 1940 |
| 2,252,358 | Tosi | Aug. 12, 1941 |
| 2,368,839 | Jansen | Feb. 6, 1945 |
| 2,490,669 | Burke | Dec. 6, 1949 |
| 2,527,437 | Matras | Oct. 24, 1950 |
| 2,732,543 | Mogren | Jan. 24, 1956 |